United States Patent
Koma et al.

(10) Patent No.: US 8,770,848 B2
(45) Date of Patent: Jul. 8, 2014

(54) AXLE BEARING SYSTEM

(75) Inventors: Yutaka Koma, Hachioji (JP); Shigeaki Furusawa, Yokohama (JP); Keiichi Furukawa, Nara (JP); Shigeru Inoue, Yokohama (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 426 days.

(21) Appl. No.: 12/737,390

(22) PCT Filed: Jul. 7, 2009

(86) PCT No.: PCT/JP2009/062334
§ 371 (c)(1),
(2), (4) Date: Jan. 7, 2011

(87) PCT Pub. No.: WO2010/004975
PCT Pub. Date: Jan. 14, 2010

(65) Prior Publication Data
US 2011/0129176 A1   Jun. 2, 2011

(30) Foreign Application Priority Data

Jul. 8, 2008  (JP) ................ P2008-177530

(51) Int. Cl.
 *F16C 33/76*  (2006.01)
 *F16C 13/00*  (2006.01)
(52) U.S. Cl.
 USPC .............. 384/484; 384/589; 277/919
(58) Field of Classification Search
 USPC .......... 384/484–486, 544, 589; 277/348, 349, 277/352, 353, 549, 919
 See application file for complete search history.

(56) References Cited

U.S. PATENT DOCUMENTS

| 5,139,425 | A |   | 8/1992 | Daviet et al. |   |
|---|---|---|---|---|---|
| 5,813,675 | A | * | 9/1998 | Otto | 277/549 |
| 5,944,321 | A | * | 8/1999 | Niebling et al. | 277/549 |
| 6,592,264 | B2 | * | 7/2003 | Yabe et al. | 384/484 |
| 7,011,451 | B2 | * | 3/2006 | Tajima et al. | 384/448 |
| 7,021,830 | B2 | * | 4/2006 | Takehara et al. | 384/486 |
| 7,793,939 | B2 | * | 9/2010 | Ishikawa et al. | 277/353 |

(Continued)

FOREIGN PATENT DOCUMENTS

| EP | 1 398 180 A2 | 3/2004 |
|---|---|---|
| EP | 1 496 293 A1 | 1/2005 |

(Continued)

OTHER PUBLICATIONS

European Search Report issued on Mar. 19, 2012.

(Continued)

*Primary Examiner* — James Pilkington
(74) *Attorney, Agent, or Firm* — McGinn IP Law Group, PLLC (57) ABSTRACT

An axle bearing system includes a bearing portion which includes an inner ring, an outer ring and a plurality of rolling elements which are interposed between the inner ring and the outer ring and which is installed on a hub shaft with seal portions which are each formed by a slinger, a core metal and a non-conductive seal provided therebetween mounted in annular opening portions formed between the inner ring and the outer ring. A conductive body is attached to the seal portion so as to provide an electrical conducting state between the outer ring and the inner ring.

17 Claims, 5 Drawing Sheets

(56) References Cited

U.S. PATENT DOCUMENTS

| | | |
|---|---|---|
| 2004/0046441 A1 | 3/2004 | Ohtsuki |
| 2005/0089254 A1 | 4/2005 | Takehara et al. |
| 2005/0236887 A1 | 10/2005 | Ohtsuki |
| 2007/0076994 A1* | 4/2007 | Norimatsu et al. ............ 384/486 |
| 2007/0230853 A1* | 10/2007 | Inoue et al. .................... 384/589 |
| 2009/0003746 A1 | 1/2009 | Norimatsu et al. |

FOREIGN PATENT DOCUMENTS

| | | |
|---|---|---|
| JP | 4-88719 | 7/1992 |
| JP | 6-80956 U | 11/1994 |
| JP | 2000-266067 A | 9/2000 |
| JP | 2002-195280 A | 7/2002 |
| JP | 2004-353709 A | 12/2004 |
| JP | 2005-83442 A | 3/2005 |
| JP | 2007-302202 A | 11/2007 |
| WO | WO2008/062684 * | 5/2008 |

OTHER PUBLICATIONS

Japanese Notification of Reasons for Refusal dated Dec. 3, 2013 with English Translation.

* cited by examiner

AXLE BEARING SYSTEM

CROSS-REFERENCE TO RELATED APPLICATIONS

This application is based upon and claims the benefit of priority from the prior Japanese Patent Application (No. 2008-177530) filed on Jul. 8, 2008, the contents of which are incorporated herein by reference.

TECHNICAL FIELD

The present invention relates to an axle bearing system and more particularly to an axle bearing system including a means for discharging static electricity charged in an outer ring of a bearing portion mounted on a hub shaft.

BACKGROUND ART

In an axle bearing system for holding a road wheel of a motor vehicle, for example, there may occur a situation in which static electricity is charged in an outer ring due to a potential difference being generated between an inner ring and the outer ring of a bearing portion mounted in the axle bearing system, thereby causing sparking to be repeated intermittently. Since such sparking acts on a radio and electronic equipment mounted in the vehicle as electric noise and affects them badly, an electrical conducting state is produced between the inner ring and the outer ring so that the inner ring and the outer ring are at the same potential so as to discharge the charged static electricity.

In conventional axle bearing systems of this type, there is an axle bearing system which has a sealing device made up of a plurality of annular members which are mounted between two members which rotate relatively to each other so as to seal off an interior of the axle bearing system from an exterior thereof and in which a seal ring in which a seal lip made of a conductive rubber is formed on a reinforcement ring made of a conductive material and a metallic ring made of a conductive material are assembled together and a hollow portion is formed which is surrounded by these members so that a conductive grease is sealed between the two members to provide an electrical conducting state (for example, refer to Patent Document 1).

RELATED ART DOCUMENTS

Patent Documents

Patent Document 1: JP-UM-A-6-80956 (Page 2, FIG. 1)

SUMMARY OF THE INVENTION

Problem to be Solved by the Invention

In the bearing system in Patent Document 1, electric conductivity is ensured between the outer member (outer ring) and the inner member (inner ring) by the seal ring made of the conductive rubber and the conductive grease.

Incidentally, a bearing portion of an axle bearing system tends to easily be heated to high temperatures. In particular, a conductive seal ring or a ring-like elastic seal (hereinafter, these are to be generally referred to as a packed seal) which is made of a rubber member and which is positioned within an area surround by a slinger and a core metal is weaken by heat. Because of this, there has been a problem that when they are heated to a temperature exceeding 150° C., their sealing functions are reduced.

In order to solve such a problem, is an occasion when a fluororubber having superior heat resistance is used for the packed seal. However, since the packed seal made of fluororubber (hereinafter, referred to as a fluorine seal) has no conducting function, no electrical conducting state can be provided between an outer ring and an inner via such a fluorine seal. Because of this, a conductive dust seal or the like is retrofitted between the bearing portion and a hub shaft separately from the fluorine seal, so that an electrical conducting state is provided between the outer ring and the inner ring via the conductive dust seal.

However, mounting a conductive dust seal like this is troublesome. In the event that a sufficient space cannot be ensured between the bearing portion and the hub shaft, the conductive dust seal cannot be mounted, and hence, the conductivity between the outer ring and the inner ring cannot be ensured.

In this case, although it can be considered to use an acrylic resin having conductivity and superior heat resistance as a packed seal, since it is weakened by water, acrylic resin cannot be used in a bearing system for vehicles such as motor vehicles on which muddy water is easily poured while the vehicle is running.

The invention has been made with a view to solving the problem, and an object thereof is to provide an axle bearing system which can secure conductivity between an outer ring and an inner ring in a bearing portion in which a fluorine seal is used in a seal portion in an ensured fashion, even in the event that a sufficient space is not provided between the bearing portion and a hub shaft.

Means for Solving the Problem

According to the invention, there is provided an axle bearing system comprising: an inner ring; an outer ring which forms an annular opening portion between the inner ring and the outer ring; a plurality of rolling elements interposed between the inner ring and the outer ring; a seal portion formed by a slinger provided in the annular opening portion, a core metal provided in the annular opening portion and a non-conductive seal provided between the slinger and the core metal; and a conductive body provided in the seal portion to provide an electrical conducting state between the outer ring and the inner ring.

The conductive body is formed into a substantially cylindrical shape, and one side of the conductive body is attached to the core metal of the seal portion, and the other side thereof is formed so as to contact the hub shaft. Alternatively, the conductive body is formed into a substantially circularly annular shape, and a radially inner side of the conductive body is attached to the slinger of the seal portion, and a radially outer side thereof is formed so as to contact the core metal of the seal portion or the outer ring.

According to the invention, there is provided an axle bearing system including a bearing portion which is mounted on a hub shaft and includes an inner ring, an outer ring and a plurality of rolling elements interposed between the inner ring and the outer ring and to which seal portions each formed by a slinger, a core metal and a non-conductive seal provided therebetween mounted in annular opening portions formed between the inner ring and the outer ring are attached, wherein an annular conductive body is installed on a driveshaft on which the hub shaft is mounted such that the conductive body contacts the outer ring of the bearing portion.

Advantages of the Invention

According to the invention, in the seal portions of the bearing portion having the non-conductive seal, static electricity is discharged by causing the outer ring and the inner ring to be at the same potential level so as to ensure the same potential therebetween by providing the electrical conducting state between the outer ring and the inner ring through provision of the annular conductive body in one of the seal portions or on the drive shaft. Therefore, the conductivity between the outer ring and the inner ring can be secured easily and in an e ensured fashion with the simple construction. In addition, corrosion of the fitting portion between the slinger and the inner ring or the fitting portion between the core metal and the inner ring can be suppressed. Thus, the highly reliable axle bearing system can be obtained by securing the conductivity between the outer ring and the inner ring and suppressing the corrosion of those fitting portions.

BRIEF DESCRIPTION OF THE DRAWINGS

FIG. 5(*a*) is an explanatory view of a modification to the seal portion of Embodiment 1, and FIG. 5(*b*) is an explanatory view of another modification to the seal portion of Embodiment 1.

MODE FOR CARRYING OUT THE INVENTION (Embodiment 1)

Figure 1:
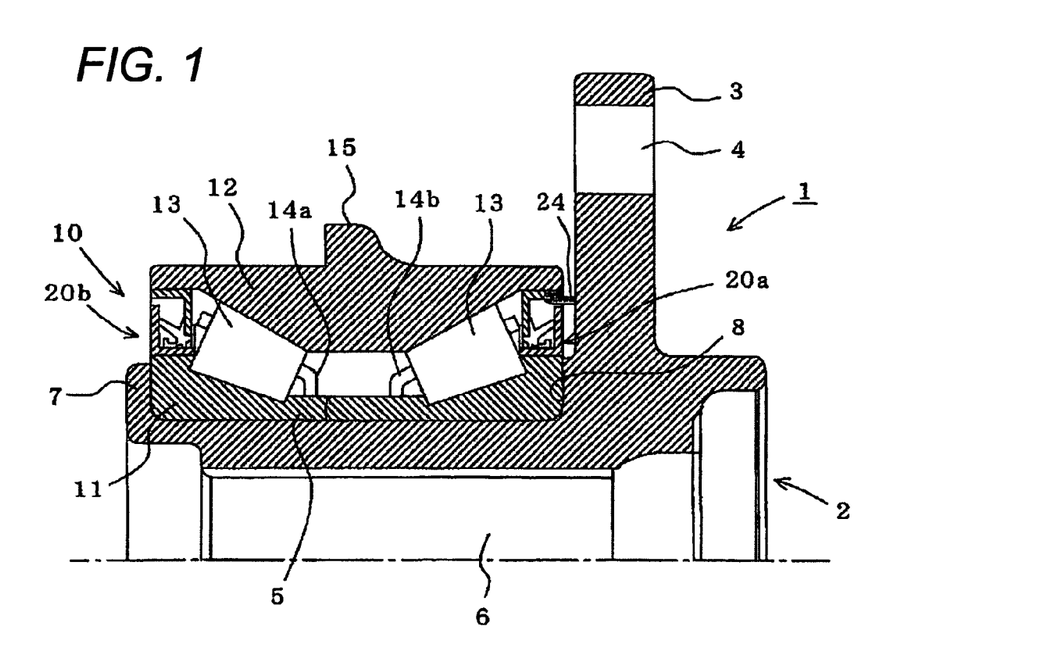
FIG. 1 is a vertical sectional view of a main part of an axle bearing system according Embodiment 1 of the invention.
Figure 2:
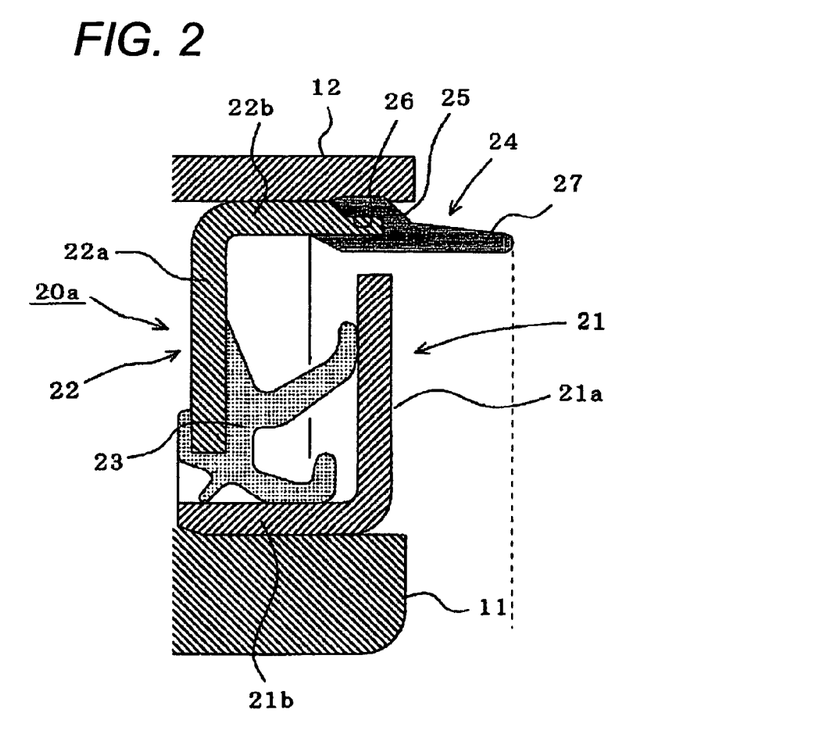
FIG. 2 is an explanatory view of a seal portion of FIG. 1.

FIG. 1 is a vertical sectional view of a main part of an axle bearing system according to Embodiment 1 of the invention, and FIG. 2 I an enlarged view of a seal portion of FIG. 1. This embodiment includes an inner ring rotating type bearing portion. In the following description, a left-hand side of each figure is referred to as an inner side, and a right-hand side as an outer side.

In the figures, reference numeral 1 denotes an axle bearing system. A flange 3 having a plurality of bolt holes 4 into which bolts (not shown) for attaching a road wheel (not shown) are press fitted is provided on an outer circumference on an outer side of a hub shaft 2 made of a steel material. A cylindrical portion 5 is provided at a central portion of the flange 3 which projects towards an inner side and on an outer circumference of which a bearing portion 10, which will be described later, is installed. Reference numeral 6 denotes a through hole which is provided to penetrate axially through a central portion of the cylindrical portion 5 and into which a driveshaft is fitted, and a spline is provided on an inner circumference thereof in general.

The bearing portion 10 includes an inner ring 11 which is made of a bearing steel material and which is divided into two portions on which rolling surfaces (raceway surfaces) are provided between rib portions formed at both end portions of the inner ring 11, an outer ring 12 which is made of a bearing steel material and on which two rows of rolling surfaces are provided so as to correspond to the rolling surfaces of the inner ring 11, and tapered rollers 13 as rolling elements made of a bearing steel material which are individually retained in a rolling fashion within pockets of cages 14*a*, 14*b* made of a steel material or a resin material and which are disposed into two rows between the rolling surfaces of the inner ring 11 and the outer ring 12. Of the two divided portions of the inner ring 11, one divided portion may be formed integrally with the hub shaft 2 and the other divided portion may be formed by a separate member.

Reference numerals 20*a*, 20*b* denote seal portions which seal annular opening portions formed at both sides of the inner ring 11 and the outer ring 12. As is shown in FIG. 2, the seal portions 20*a*, 20*b* are each made of a slinger 21 which is pressed into an annular shape using a metallic plate such as a stainless steel plate, which has an L-shaped outer circumferential section, and of which a cylindrical portion 21*b* is press fitted on an outer circumference of one end portion of the inner ring with a circumferential wall 21*a* disposed axially outwards, a core metal 22 which is pressed into an annular shape using a stainless steel plate of the same type, which has an inverted L-shaped outer circumferential section, and of which a cylindrical portion 22*b* is press fitted in an inner circumference of one end portion of the outer ring 12 with a circumferential wall 22*a* disposed axially inwards of the slinger 21, and a seal made of a non-conductive material such as a fluorine seal 23 made of a fluororubber which is attached to the circumferential wall 22*a* of the core metal 22, which is positioned within an area surrounded by the slinger 21 and the core metal 22, and of which a lip is brought into press contact with the slinger 21.

A substantially cylindrical conductive body 24 made of a conductive synthetic rubber such as a conductive Nitrile Butadiene Rubber (NBR) is attached to an outer end portion of the cylindrical portion 22*b* of the core metal 22 of the outer seal portion 20*a*.

Figure 3:
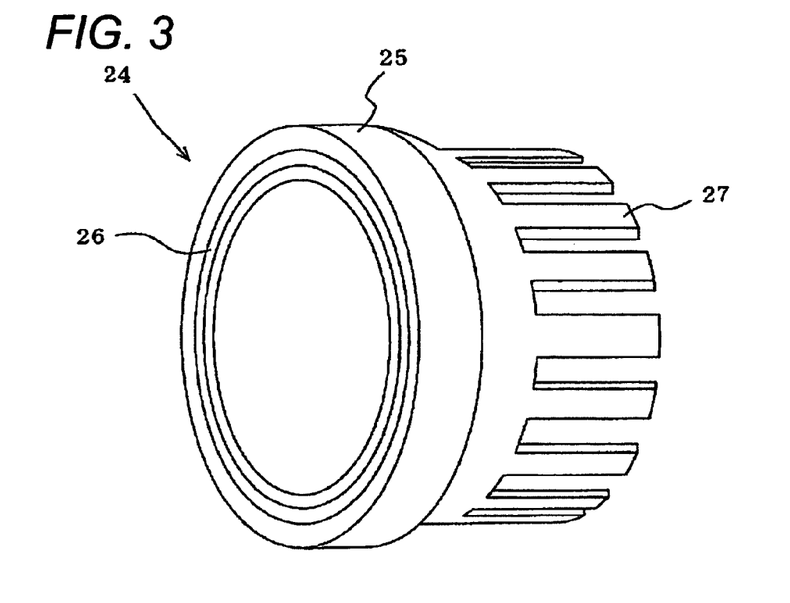
FIG. 3 is an explanatory view of a conductive body of FIG. 2.

For example, as is shown in FIG. 3, the conductive body 24 is made up of an attaching portion 25 which is provided at one side and which has a fitting groove 26 which is fittingly fitted on the cylindrical portion 22*b* of the core metal 22 and a lip portion 27 which is provided at the other side. The lip portion 27 is divided into a plurality of portions like a row of narrow teeth of a comb.

Next, an example of an assembling procedure of the axle bearing system 1 which is configured in the way described heretofore will be described.

Firstly, in the assembly of the bearing portion 10 which includes the inner ring 11, the outer ring 12 and the tapered rollers 13, as is shown in FIG. 2, the seal portion 20*a* having the conductive body 24 is press fitted into the outer annular opening portion of the annular opening portions which are formed at both sides of the inner ring 11 and the outer ring 12. The seal portion 20*b* having no conductive body 24 is press fitted in the inner annular opening portion, whereby the bearing portion 10 is built up.

Figure 4:
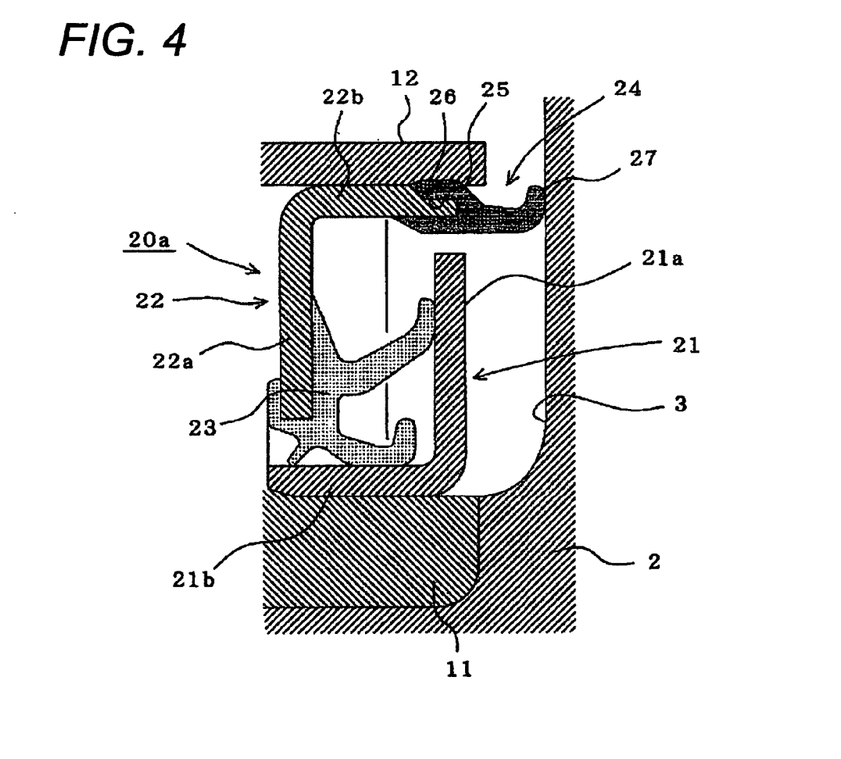
FIG. 4 is an explanatory view of the seal portion when a bearing portion is mounted on a hub shaft.

Next, the inner ring 11 of the bearing portion 10 so built up is press fitted on the cylindrical portion 5 of the hub shaft 2 from the inner side with the seal portion 20*a* disposed on the outer side (flange portion 3 side), an inner end portion of the cylindrical portion 5 is bent so as to clamp the inner ring 11 (a clamping portion 7). By doing this, an axial force is imparted between the clamping portion 7 and a step portion 8 provided on the outer side, whereby the bearing portion 10 is fixed to the hub shaft 2. As this occurs, the lip 27 of the conductive body 24 of the outer seal portion 20a is, as is shown in FIG. 4, pressed against a wall surface of the flange portion 3 of the hub shaft 2 and is then bent so as to be brought into press contact therewith.

The hub shaft 2, on which the bearing portion 10 is provided in the way described above, is fixed integrally to the driveshaft (not shown) with the through hole 6 fitted on the driveshaft. A flange portion 15 provided on the outer ring 12 of the bearing portion 10 is fixed to an axle case or the like so as not to rotate, and the hub shaft 2 including the driveshaft and the inner ring 11 of the bearing portion 10 are supported rotatably via the tapered rollers 13.

In the axle bearing system 1 which is attached to the driveshaft, when the driveshaft rotates, the hub shaft 2 which is integrated with the driveshaft and the inner ring 11 of the bearing portion 10 and the slingers 21 of the seal portions 20a, 20b rotate.

On the other hand, the outer ring 12 of the bearing portion 10, the core metals 22 of the seal portions 20a, 20b and the fluorine seals 23 which are attached to the corresponding core metals 22 do not rotate. The lips of the fluorine seals 23 are brought into sliding contact with the rotating slingers 21 so as to seal the annular opening portions.

As this occurs, the conductive body 24 which is provided at the core metal 22 of the seal portion 20a does not rotate, either, and the lip portion 27 thereof is brought into sliding contact with the wall surface of the flange 3 of the rotating hub shaft 2.

By the sliding contact of the lip portion 27 with the wall surface of the flange 3, the conductivity between the outer ring 12 and the inner ring 11 is ensured via the core metal 22, the conductive body 24 and the hub shaft 2, so that both the rings are held at the same potential level. Thus, no static electricity is charged in the outer ring 12, and therefore, no spark is generated. The intrusion of muddy water scattered by the running vehicle into an interior of the bearing portion 10 is prevented by the seal portions 20a, 20b.

Further, as the conducting path between the inner and outer rings, since the fluorine seal 23 is non-conductive, a current can be carried to the hub shaft 2 for preference from the core metal 22 by way of the conductive body 24 (a current may be carried to the core metal 22 from the hub shaft 2 by way of the conductive body 24). Because of this, since there is little to establish the electrical conduction via the slinger 21, corrosion of the fitting portion between the slinger 21 and the inner ring 11 can be suppressed.

(Modification to Embodiment 1)

Figure 5A:
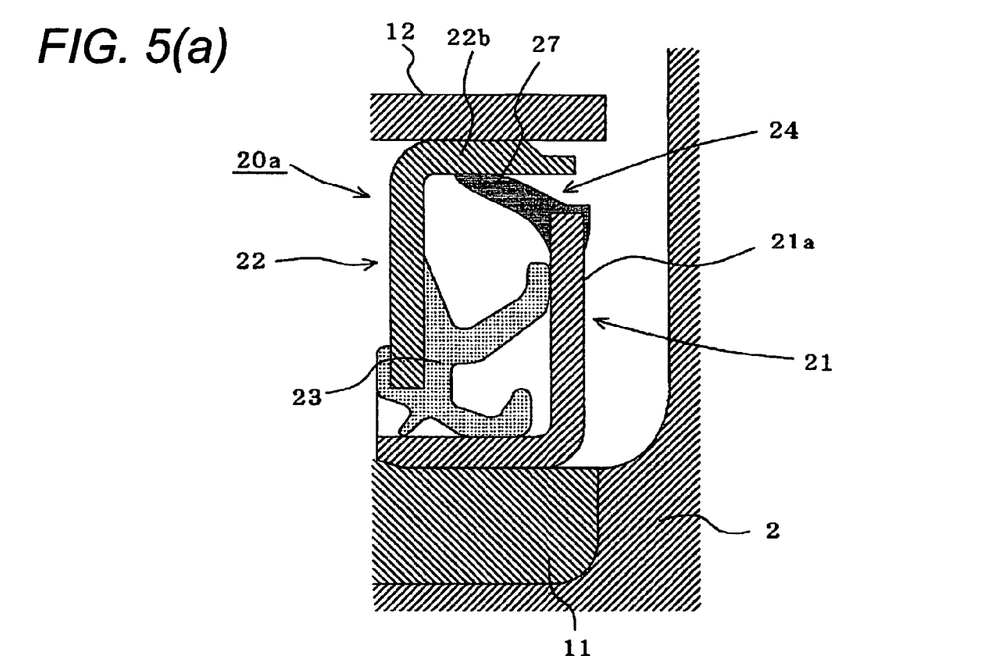
Figure 5B:
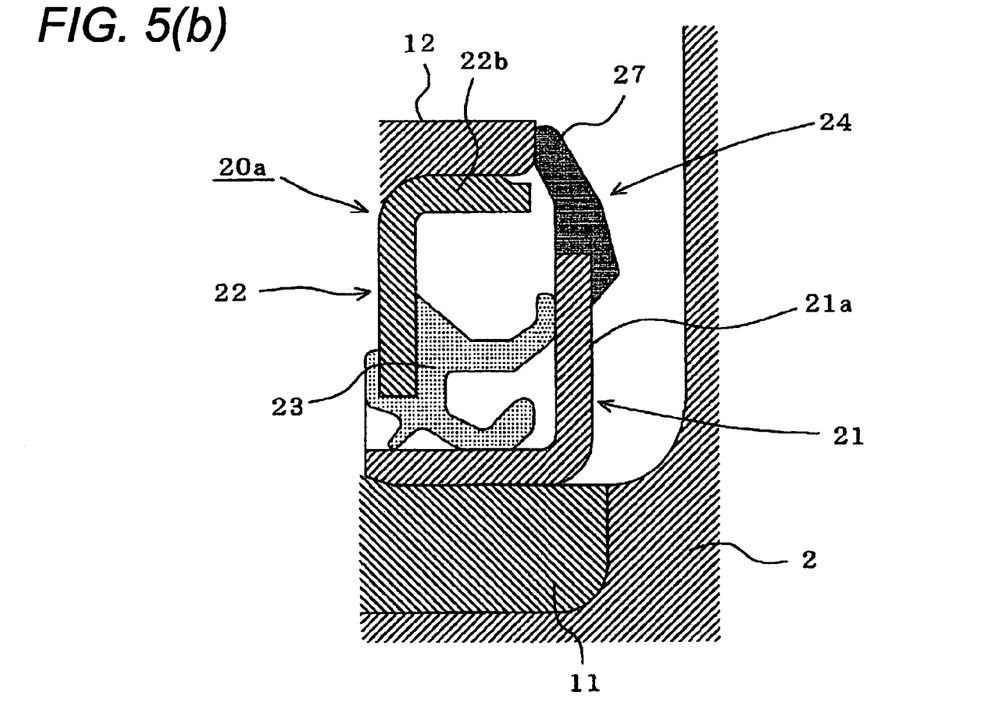
Figure 6:
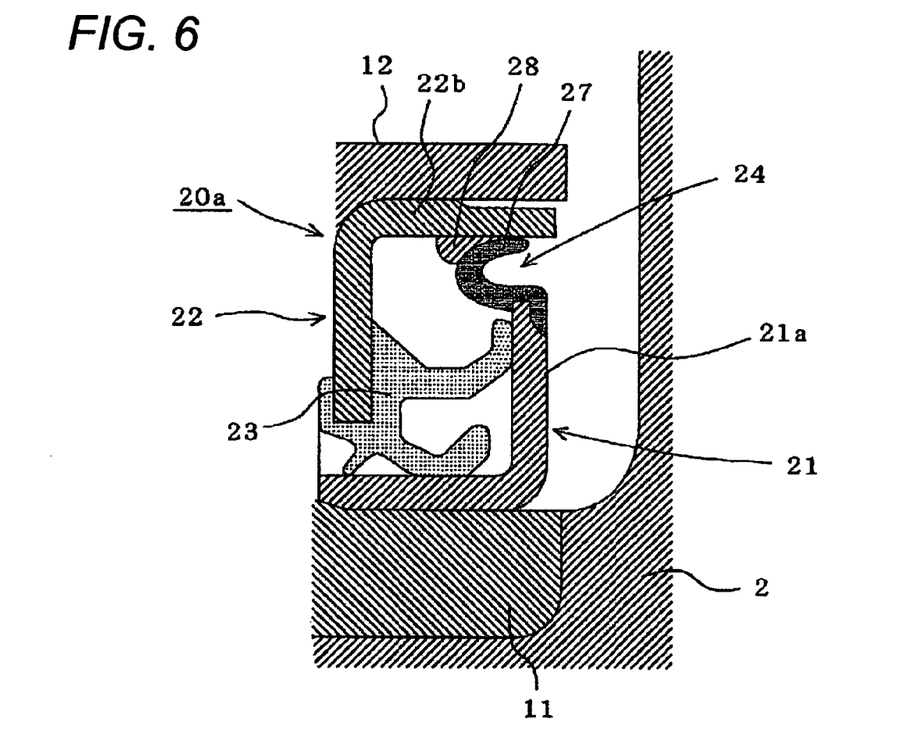
FIG. 6 is an explanatory view of a yet another modification to the seal portion of Embodiment 1.

FIGS. 5, 6 are explanatory views showing other examples of seal portions 20a of the bearing portion 10 of the axle bearing system 1 according to the embodiment of the invention.

FIG. 5(a) shows a modification in which a radially inner side of an annular and flared conductive body 24 which is made of a conductive synthetic rubber is attached to an outer circumferential end portion of a slinger 21 which is fixed to an inner ring 11 and is of a seal portion 20a of a bearing portion 10, and a lip portion 27 provided on an outer circumference thereof is brought into abutment with an inner circumferential surface of a cylindrical portion 22b of a core metal 22 fixed to an outer ring 12. In this case, the core metal 22 needs to be formed of a metallic material such as a steel plate having conductivity.

FIG. 5(b) shows another modification in which a radially inner side of an annular conductive body 24 made of a conductive synthetic rubber is attached to an outer circumferential portion of a slinger 21 and a lip portion 27 thereof is brought into abutment with an outer side end face of an outer ring 12.

Further, FIG. 6 shows a yet another modification in which a radially inner side of an annular conductive body 24 having a larger diameter than an inside diameter of a cylindrical portion 22b of a core metal 22 which is made of a conductive synthetic rubber is attached to an outer circumferential end portion of a slinger 21, a lip portion 27 thereof is bent substantially into a C-like shape so as to be brought into abutment with an inner circumferential surface of the cylindrical portion 22b of the core metal 22, and a grease 28 is filled between an inner side of the lip portion 27 and the inner circumferential surface of the cylindrical portion 22b of the core metal 22.

The lip portions 27 of the conductive bodies 24 of FIGS. 5 and 6 do not need to be brought into abutment with the core metal 22 or the outer ring 12 along the full circumference thereof. For example, as is shown in FIG. 3, the lip portions 27 may be formed into a row of narrow teeth of a comb so as to be brought into abutment with the relevant part intermittently. Thus, at least part of the lip portion 27 may only have to be brought into abutment with the relevant part so as to establish an electrical conduction.

In the case of FIGS. 5(a) and 6, the outer ring 12 and the inner ring 11 of the bearing portion 10 are put in an electrical conducting state via the core metal 22, the conductive body 24 and the slinger 21. In the case of FIG. 5(b), the outer ring 12 and the inner ring 11 are put in an electrical conducting state via the conductive body 24 and the slinger. Thus, since both the outer ring 12 and the inner ring 11 are held at the same potential level, there is caused no such situation that static electricity is charged in the outer ring 12.

In the descriptions of FIGS. 5(a), 5(b), while the conductive body 24 is described as being provided on the outer seal portion 20a, the conductive body 24 may be provided on the inner seal portion 20b.

According to the embodiment, a retrofitting dust seal or the like does not have to be provided in the seal portions 20a, 20b of the bearing portion 10 having the non-conductive fluorine seal 23. Instead, the annular conductive body 24 which establish an electrical conduction between the outer ring 12 and the inner ring 11 is provided in the seal portion 20a so that the electrical conducting state is provided between the outer ring 12 and the inner ring 11 to hold both the rings at the same potential level. Thus, even in the event that no sufficient space is ensured between the bearing portion 10 and the hub shaft 2, the electrical conductivity can be secured between the outer ring 12 and the inner ring 11 easily and in an ensured fashion with the simple construction, thereby making it possible to prevent the charging of static electricity.

Further, as the conducting path between the inner and outer rings, since the fluorine seal 23 is non-conductive, it is possible to establish the electrical conduction from the slinger 21 to the outer ring 12 via the conductive body 24 (the electric conduction may be established from the outer ring to the slinger 21 via the conductive body 24). Because of this, in the construction shown in FIG. 5(b) in particular, since there is little to establish the electrical conduction via the core metal 22, corrosion of the fitting portion between the core metal 22 and the outer ring 12 can be suppressed.

In the description made above, while the seal portion 20 according to the embodiment is described as being used in the axle bearing system 1 including the inner ring rotating type bearing portion 10, the seal portion 20 according to the embodiment can also be used in an axle bearing system including an outer ring rotating type bearing portion.

(Embodiment 2)

Figure 7:
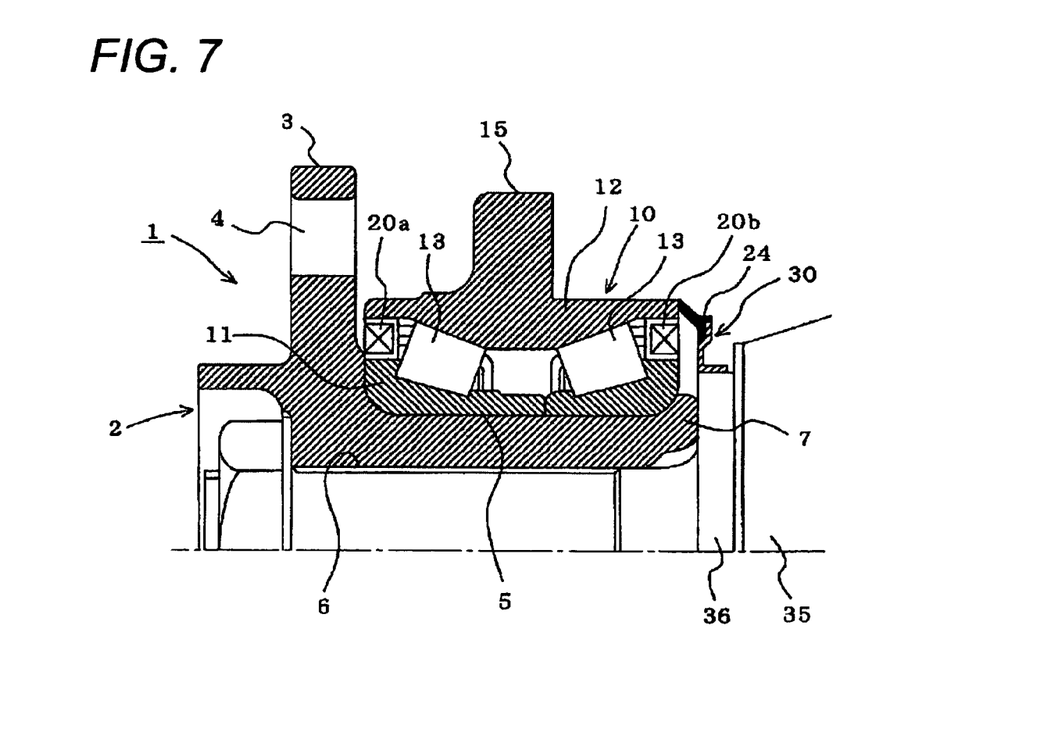
FIG. 7 is a vertical sectional view of an axle bearing system according to Embodiment 2 of the invention.
Figure 8:
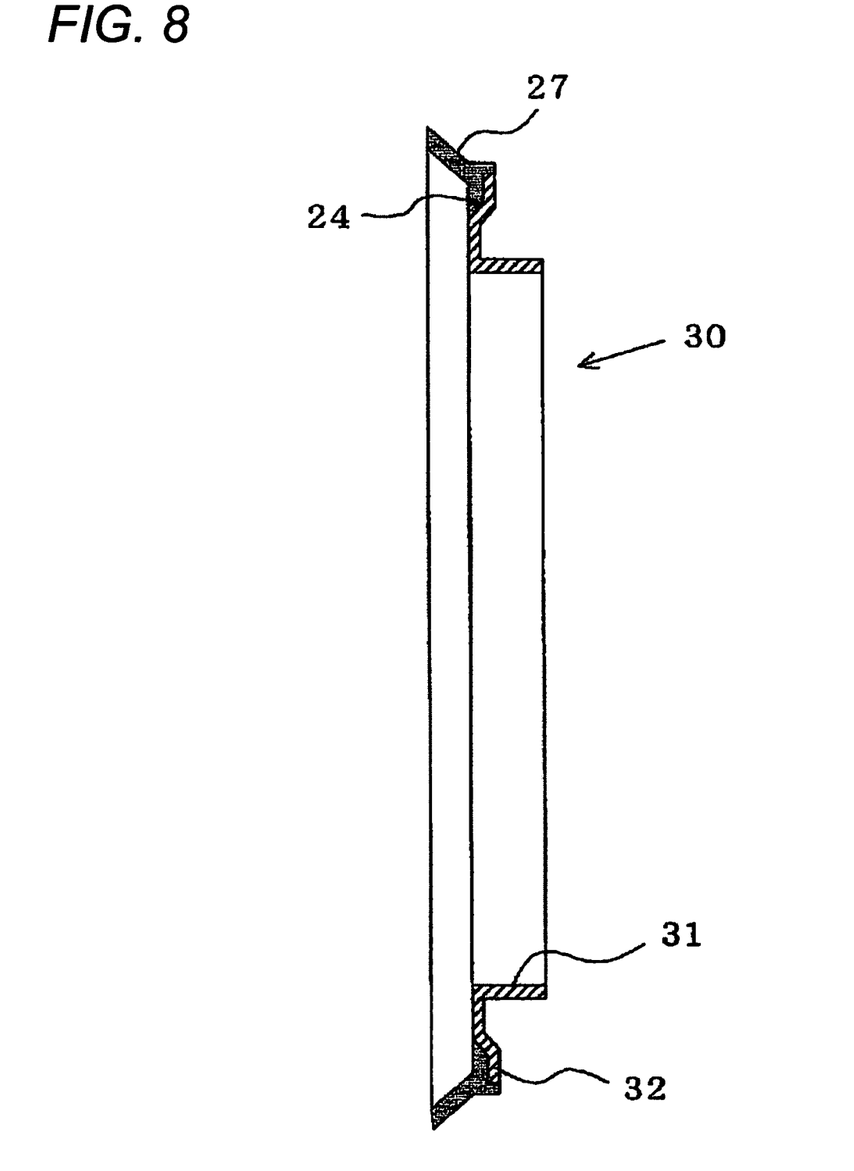
FIG. 8 is an explanatory view of a conductive member of FIG. 7.

FIG. 7 is a sectional view of a main part of an axle bearing system according to Embodiment 2 of the invention, and FIG. 8 is a sectional view of a conductive member of FIG. 7. FIG. 7 shows a state in which a driveshaft 35 is fixedly fitted in a through hole 6 in a hub shaft 2. In the following description, a right-hand side of each figure is referred to as an inner side, and a left-hand side as an outer side. Like reference numerals will be given to like portions to those of Embodiment 1, so as to omit the repetition of the same description.

Reference numeral 30 denotes a conductive member. As is shown in FIG. 8, the conductive member 30 is formed into an annular shape by a cylindrical portion 31 and a flange portion 32 which is provided on an outer circumference of the cylindrical portion 31 by pressing a metallic plate such as an iron or stainless steel plate. An annular and flared conductive body 24 made of a conductive synthetic rubber such as a conductive NBR is attached integrally to the flange portion 32. An inside diameter of the cylindrical portion 31 is almost equal to an outside diameter of a step portion 36 of the driveshaft 35. An outside diameter of a lip portion 27 of the conductive body 24 is formed so as to be almost equal to or slightly smaller than an outside diameter of an outer ring 12 of a bearing portion 10. As with Embodiment 1, the lip portion 27 is formed into a row of narrow teeth of a comb.

The conductive member 30 configured in the way described above is fixed by means of an adhesive or the like by press fitting or fitting the cylindrical portion 31 on the step portion 36 of the driveshaft 35 with the lip portion 27 disposed on an outside.

Then, a through hole 6 in a hub shaft 2 of an axle bearing system 1 is fitted on the driveshaft 35 so as to be fixed thereto. By doing this, the step portion 36 of the driveshaft 35 is brought into abutment with a clamping portion 7 of the hub shaft 2. The lip portion 27 of the conductive body 24 of the conductive member 30 is pressed against an inner end face of the outer ring 12 of the bearing portion 10.

In the embodiment that is configured in the way described above, the outer ring 12 of the bearing portion 10 is fixed in a similar manner to that of Embodiment 1, and the hub shaft 2 and an inner ring 11 are driven to rotate by the drive shaft 35. As this occurs, the conductive member 30 which is installed on the step portion 36 of the driveshaft 35 also rotates, whereby the lip portion 27 of the conductive body 24 which is provided on the conductive member 30 rotates while being in sliding contact with the end face of the outer ring 12.

By this configuration, an electrical conducting state is provided between the outer ring 12 and the inner ring 11 via the conductive member 30 including the conductive body 24, the driveshaft 35 and the hub shaft 2, whereby the outer ring 12 and the inner ring 11 are held at the same potential level. While the conductive member 30 is described as being made of the metallic member and the conductive rubber, a conductive rubber may be attached directly to the driveshaft 35.

In this embodiment, too, almost the same advantage as that obtained in Embodiment 1 can be obtained.

In the above description, while the invention is applied to the axle bearing system 1 depicted in the figures, the invention is not limited thereto and hence, the invention can also be applied to axle bearing systems having other constructions.

The invention can, of course, be carried out in various ways without departing from the spirit and scope thereof While the invention has been described in detail by reference to the specific embodiments, it is obvious to those skilled in the art to which the invention pertains that various alterations or modifications can be made to the embodiments described without departing from the spirit and scope or scope of intention of the invention.

INDUSTRIAL APPLICABILITY

According to the invention, the electrical conductivity between the outer ring and the inner ring can be secured easily and in an ensured fashion with the simple construction, thereby making it possible to obtain the highly reliable axle bearing system.

DESCRIPTION OF REFERENCE SYMBOLS 1 axle bearing system
2 hub shaft
3 flange
5 cylindrical portion
6 through hole
10 bearing portion
11 inner ring
12 outer ring
13 tapered roller (rolling element)
20a, 20b seal portion
21 slinger
22 core metal
23 fluorine seal
24 conductive body
27 lip portion
30 conductive member
35 driveshaft
36 step portion.

The invention claimed is:

1. An axle bearing system comprising:
an inner ring;
an outer ring, an annular opening portion being formed between the inner ring and the outer ring;
a plurality of rolling elements interposed between the inner ring and the outer ring;
a seal portion that comprises a slinger provided in the annular opening portion, a core metal provided in the annular opening portion and a non-conductive seal provided between the slinger and the core metal; and
a conductive body attached to the seal portion to provide an electrical conducting state between the outer ring and the inner ring.

2. The axle bearing system according to claim 1, wherein the conductive body is formed substantially into a cylindrical shape and includes a side attached to the core metal of the seal portion and an other side contacting a hub shaft.

3. The axle bearing system according to claim 1, wherein the conductive body is formed substantially into an annular shape and includes a radially inner side attached to the slinger of the seal portion and a radially outer side contacting the core metal of the seal portion or the outer ring.

4. The axle bearing system according to claim 1, wherein the conductive body is formed of a synthetic rubber comprising electrical conductivity.

5. The axle bearing system according to claim 1, wherein the conductive body is attached to at least one of the core metal and the slinger.

6. The axle bearing system according to claim 1, wherein the conductive body comprises a lip portion which slidably contacts a flange.

7. The axle bearing system according to claim 1, wherein the conductive body is attached to the outer ring.

8. The axle bearing system according to claim 1, further comprising a plurality of seal portions,
   wherein the conductive body is attached to a seal portion of the plurality of seal portions.

9. The axle bearing system according to claim 1, wherein the conductive body is attached to at least one of an inner circumferential surface of the core metal and an outer circumferential surface of the core metal.

10. The axle bearing system according to claim 1, wherein the conductive body is attached to the slinger on a side of the slinger which is axially opposite to the non-conductive seal.

11. The axle bearing system according to claim 1, wherein the conductive body is attached to the seal portion via a groove formed in the conductive body.

12. The axle bearing system according to claim 1, wherein the conductive body is attached to an outer circumferential end portion of the slinger.

13. The axle bearing system according to claim 1, wherein a lip portion provided on an outer circumference of the conductive body is brought into abutment with the outer ring or a cylindrical portion of the core metal fixed to the outer ring.

14. The axle bearing system according to claim 1, wherein the conductive body is attached to an inner circumferential surface of the core metal and an outer circumferential surface of the core metal.

15. An axle bearing system comprising:
   a hub shaft;
   a bearing portion attached to the hub shaft, the bearing portion comprising:
   an inner ring;
   an outer ring, an annular opening portion being formed between the inner ring and the outer ring;
   a plurality of rolling elements interposed between the inner ring and the outer ring;
   a seal portion that comprises a slinger provided in the annular opening portion, a core metal provided in the annular opening portion and a non-conductive seal provided between the slinger and the core metal; and
   a driveshaft comprising an annular conductive member which contacts the outer ring of the bearing portion and on which the hub shaft is mounted.

16. The axle bearing system according to claim 15, wherein the conductive body is formed of a synthetic rubber comprising electrical conductivity.

17. The axle bearing system according to claim 15, wherein the annular conductive member comprises a lip portion which slidably contacts a wall surface of a flange of the hub shaft.

* * * * *